Dec. 7, 1948.  E. J. BARTELL  2,455,464
SAW GAUGE
Filed Aug. 15, 1944  2 Sheets-Sheet 1
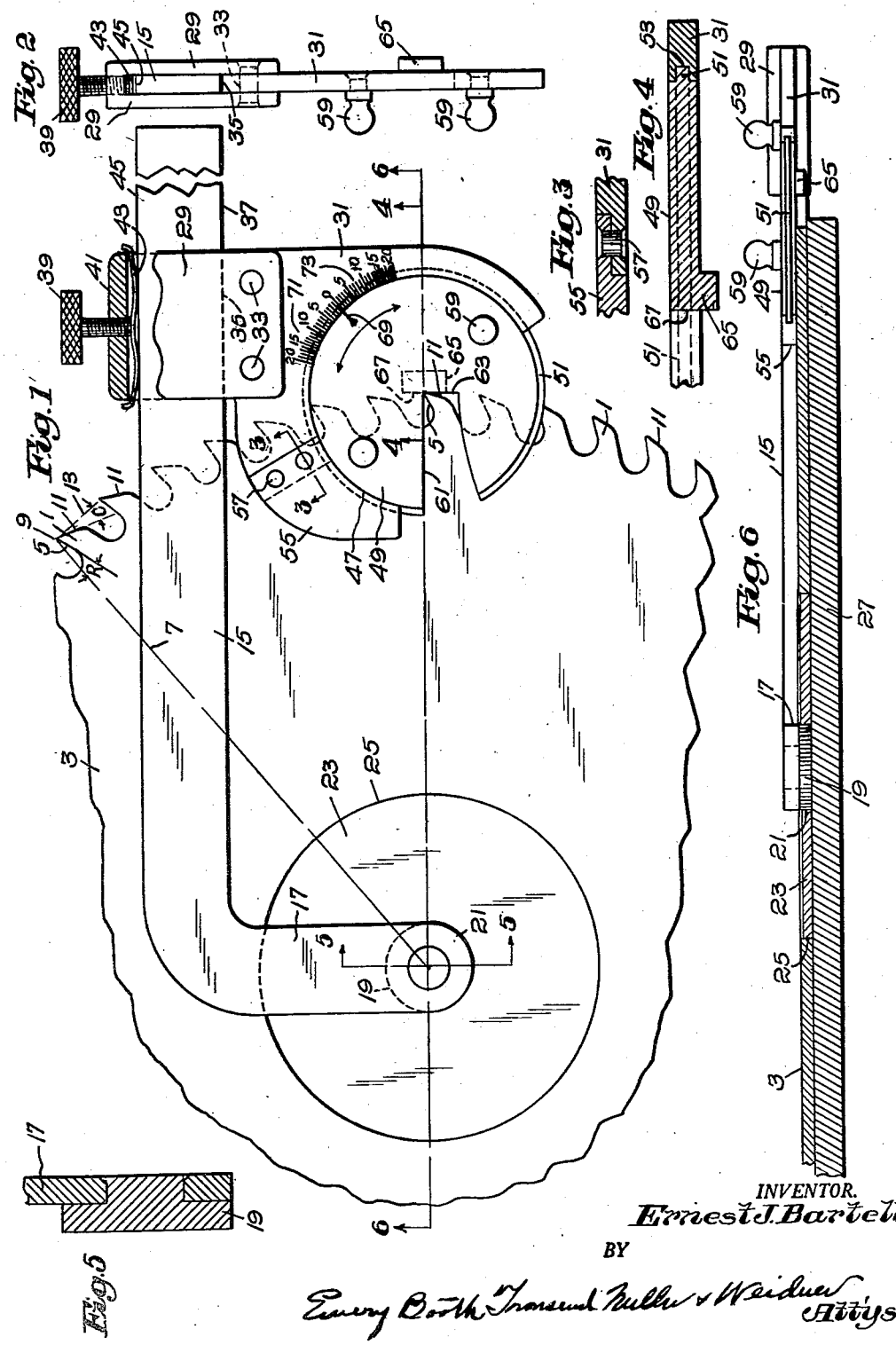
INVENTOR.
*Ernest J. Bartell*
BY
*Emery, Booth, Townsend, Miller & Weidner*
Attys.

Dec. 7, 1948. E. J. BARTELL 2,455,464
SAW GAUGE
Filed Aug. 15, 1944 2 Sheets-Sheet 2
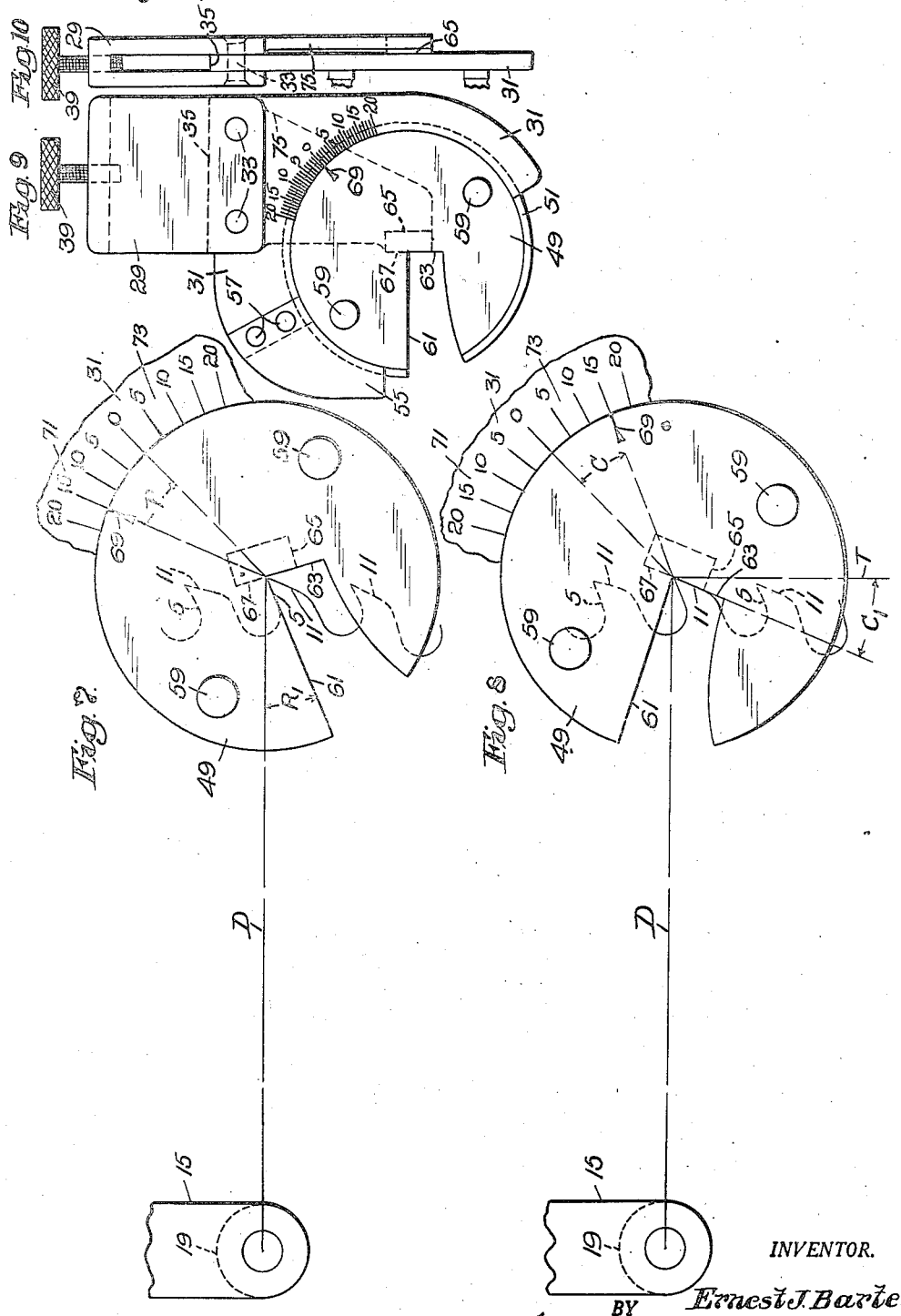
INVENTOR.
Ernest J. Bartell
BY
Emery Booth Townsend Miller & Weidner
Attys Patented Dec. 7, 1948

2,455,464

UNITED STATES PATENT OFFICE 2,455,464

SAW GAUGE

Ernest J. Bartell, Rome, N. Y.

Application August 15, 1944, Serial No. 549,541

6 Claims. (Cl. 33—202)

My invention, which relates to gauges for measuring the angles of clearance and rake of the teeth of saws and the like, will be best understood from the following description and accompanying drawings of several embodiments of the invention selected for illustrative purposes, while the scope of the invention will be more particularly pointed out in the appended claims.

In the drawings:

Fig. 1 is a plan, with parts broken away, of a gauge according to the invention, showing the manner in which it is applied to a circular saw;

Fig. 2 is an end elevation of the gauge according to Fig. 1;

Figs. 3, 4 and 5 are, respectively, fragmentary sections on the lines 3—3, 4—4 and 5—5 of Fig. 1;

Fig. 6 is a section on the line 6—6 of Fig. 1 with the gauge in elevation, showing the saw resting upon a support for indicating the manner of using the gauge;

Figs. 7 and 8 are diagrams illustrating the operation of the gauge according to Figs. 1 to 5 in measuring the angles of clearance and rake, respectively;

Fig. 9 is a plan of a modified form of the head of the gauge; and

Fig. 10 is an elevation of the head according to Fig. 9.

Although the principle of the gauge is applicable to straight saws it has its greatest usefulness in connection with circular saws and the like. In these connections it will be understood that commonly it is of extreme importance to have the angles of clearance and rake of the saw teeth properly formed so that the saw will be best suited for cutting the particular material operated upon. Heretofore no means for readily measuring these angles has been available. By use of a gauge according to the invention, however, these angles may be readily and rapidly accurately measured.

As employed herein it will be understood that the "angle of rake" of the tooth 1 (Fig. 1) of a circular saw 3 is the angle R between the "rake line" 5 of the tooth and that radial line 7 of the saw which passes through the point 9 of the tooth, and that the "angle of clearance" of the tooth is the angle C between the "clearance line" 11 of the tooth and that line 13 which includes the point of the tooth and is tangent to the circle concentric with the saw passing through that point, that is to say, a line which lies in the plane of the saw and is at right angles to the radial line 7 and passes through the point of the tooth.

The gauge illustrated comprises an arm, conveniently of flat rectangular cross-section, having an elongated portion 15 of convenient length for adapting the gauge to saws of various diameters, and a portion 17 preferably at right angles to the first mentioned portion. As shown, the portion 17 of the arm carries at its free end a cylindrical pin 19 projecting from its under side. This pin is adapted removably to fit, and be rotatably received in, a circular hole 21 at the center of a flat disk-like bushing 23, the latter being removably inserted in, and fitting, the arbor receiving opening 25 of the saw, so that the arm may be rotated relative to the saw properly to position the gauge successively to the several saw teeth. Circular saws are customarily manufactured with arbor receiving openings of standard diameters, there being several such standard diameters to take care of saws of different ranges of sizes. Consequently bushings 23 of different outside diameters must be provided where the user of the gauge desires to apply the latter to saws having a wide range of sizes. In operation the saw conveniently may be laid upon the top of a table 27, as illustrated in Fig. 6, and the bushing 23 inserted so that it will likewise rest upon the top of the table. When the pin 19 is inserted in the central opening of the bushing the arm 15 will rest upon the top of the saw and may be rotated relative to the same by the operator.

As shown in Figs. 1 and 2, slidably mounted upon the portion 15 of the arm, for adjusted movement longitudinally of the latter, is a head which comprises a U-shaped member having flat side portions 29 slidably contacting the opposite flat sides of said portion of the arm. As illustrated, positioned between the projecting free ends of the side portions 29 is a plate 31, the latter being rigidly secured to the U-shaped member by rivets 33 passing through the portions 29 and the plate. The upper edge 35 of the plate is adapted slidably to bear against the lower edge 37 of the portion 15 of the arm, and to be clamped against that edge of the arm by a set screw 39, which latter is screw-threaded into and passes through the transverse portion 41 of the U-shaped member, said transverse portion connecting the side portions 29 of that member. Preferably a leaf spring 43 is inserted between the transverse portion 41 of the U-shaped member and the upper edge 45 of the portion 15 of the arm, the end of the set screw 39 resting against the spring, the purpose of the latter being to prevent such screw from marring the edge 45 of the arm and to afford a slight frictional fit between the latter and the U-shaped member.

In the forms of the invention illustrated the plate 31 is provided with a segmental circular opening 47 in which is rotatably received a flat disk 49 conveniently of the same thickness as the plate. For rotatably mounting the disk in this opening, the peripheral edge of the disk is preferably formed intermediate its two flat sides with a rib 51, conveniently of rectangular cross-section, which rib is rotatably received in a groove 53 of corresponding cross-section formed in the edge of the opening. As shown, the arc of the segment of the opening in the plate is greater than 90° so that the disk will be retained therein. For permitting insertion of the disk in the opening, the plate is preferably formed with a part 55 (Figs. 1 and 3) which is placed in position after the disk is inserted in the opening, and is then permanently riveted to the body of the plate by the rivets 57. As shown, the disk is provided, at its side opposite that which is adjacent the saw when the gauge is in use, with a pair of upstanding knob-like handles 59 enabling the operator readily to rotate the disk relative to the plate and saw blade.

As shown, the disk 49 is provided with an opening, one straight edge of which forms a gauge line 61 for measuring the angle of rake of the saw tooth, and another straight edge of which forms a gauge line 63 for measuring the angle of clearance of the saw tooth. These edges are at right angles to each other, and intersect in the axial line of the disk. The length of the portion 17 of the arm of the gauge is such, that when the point of intersection of the two gauge lines is positioned to coincide with the point of a saw tooth, the gauge line 61 will coincide with the radial line of the saw passing through that saw point, while the gauge line 63 will be tangent to that circle concentric with the saw which passes through the point of the tooth.

As illustrated in Figs. 1 and 2, the disk 49 is integrally formed on its under side with a stop 65 constituted by a projection having a flat surface 67, in the plane of which surface lies the gauge line 63, the line of intersection of the gauge lines 61 and 63, and the axial line of the disk. As further illustrated, the disk is provided with a fixed index mark 69 cooperating with the sets of graduations 71 and 73 on the plate 31, these graduations preferably indicating degrees of angle and extending in opposite directions from a common zero mark, with which latter the index mark 69 registers when the gauge line 61 coincides with the radial line of the saw passing through the point of such saw tooth as may be in coincidence with the axial line of the disk.

In operating the gauge, the gauge arm is mounted on the saw for rotation in the way hereinbefore described, and the gauge head is adjusted along the arm and the latter rotated to bring that portion of the surface 67 of the stop 65 which lies at the intersection of the gauge lines 61 and 63 against the point of a saw tooth, after which the set screw 39 may be tightened. With the parts so positioned the disk may be rotated by the handles 59 to cause the gauge line 61 to register with the rake line 5 of the saw tooth, under which conditions the graduations 71 will indicate the angle of rake of the tooth, and, by rotating the disk in the opposite direction, the gauge line 63 may be brought into registry with the clearance line 11 of the saw tooth to cause the graduations 73 to indicate the angle of clearance of that tooth.

The operation of the gauge is best illustrated by Figs. 7 and 8.

As shown in Fig. 7, the surface 67 of the stop 65 rests against the point of a saw tooth, while the gauge line 61 is in coincidence with the rake line 5 of that tooth. Rotation of the disk to so position the gauge line 61 will place it at the angle $R_1$ from the radial line D of the saw passing through the point of that tooth. As the index mark 69 on the disk registers with zero when the gauge line 61 coincides with the radius D of the saw, the angle R indicated by the gauge equals the angle $R_1$, and consequently the gauge with its parts in their positions illustrated by Fig. 7 will indicate the angle of rake of the saw tooth.

As illustrated by Fig. 8, the disk 49 has been turned clockwise from its position illustrated by Fig. 7 to cause the gauge line 63 to coincide with the clearance line 11 of a saw tooth. So turning the disk has placed the gauge line 63 at an angle $C_1$ from the tangent line T corresponding to zero angle of clearance of the saw tooth. As the index mark 69 on the disk registers with the zero mark of the graduations on the plate 31 when the gauge line 63 coincides with the tangent line T, the angle C registered by the gauge with its parts in their positions shown in Fig. 8 will equal the angle $C_1$, and the gauge consequently will indicate the angle of clearance of the saw tooth.

It will be understood that but one of the gauge lines 61 or 63 need be employed, and that that line can be used for measuring both the angle of rake and the angle of clearance. For example, the disk 49 can be rotated to cause the gauge line 61 to register with the clearance line of the saw tooth, in which case the graduations 71, if of proper extent, would measure the complement of the angle of clearance of the saw tooth or, if desired, a set of graduations separate from those employed for indicating the angle of rake could be employed for indicating the angle of clearance if the gauge line 61 is employed for measuring the angle of clearance as well as the angle of rake. Conveniently, however, two separate gauge lines are employed for simplifying the operation of measuring the angles and preventing confusing the operator.

It will be observed, that with the parts shown in their positions illustrated by Figs. 7 and 8, rotating the disk 49 will rock the stop 65 relative to the saw tooth because the surface 67 of the stop and the point of the saw which contacts with it both include the axial line of the disk. Preferably the stop is mounted on the disk because so mounting it affords means enabling the operator readily to position the point of the saw tooth at the intersection of the gauge lines 61 and 63 and to maintain it in that position. This latter is because, with the disk 49 in its position relative to the plate 31 shown by Fig. 7 and closely adjacent positions, the stop acts to prevent the gauge from being rotated in a clockwise direction relative to the saw, and, with the disk in its position shown by Fig. 8 and closely adjacent positions, the stop acts to prevent the gauge from being rotated in a counter-clockwise direction relative to the saw. Consequently, when the surface 67 of the stop is slightly spaced from a tooth in a counter-clockwise direction relative to the saw, by rotating the disk slightly counter-clockwise relative to the plate 31 to cause the surface 67 to be in non-tangent relation to the saw, and then rotating the gauge arm clockwise toward the point of that tooth, the surface of the stop will be brought into contact with the point of that tooth, and, if the gauge has been properly adjusted on the gauge arm for measuring the angles, the point of the tooth under such conditions will be positioned at the axial line of the disk. Similarly, when the surface 67 of the stop is slightly spaced from a tooth in a clockwise direction relative to the saw, by rotating the disk slightly clockwise relative to the plate 31 to cause the surface 67 to be in non-tangent relation to the saw, and then rotating the gauge arm counter-clockwise toward the point of that tooth, the surface of the stop will be brought into contact with the point of the tooth, with the latter positioned at the axial line of the disk if the gauge head has been properly adjusted on the gauge arm. By maintaining a slight force on the gauge tending to rotate it clockwise relative to the saw with the parts in the position shown by Fig. 7, which can be readily done by the operator by the same hand that rotates the disk relative to the plate 31, the point of the tooth will be maintained against the surface 67 of the stop. With the parts in the position shown by Fig. 8 a slight pressure similarly exerted tending to rotate the gauge counter-clockwise relative to the saw will maintain the point of the tooth against the surface 67.

It will also be understood that so long as they intersect at the axial line of the disk 49 the two gauge lines 61 and 63 need not be at right angles to each other nor either at right angles to or in the plane of the surface 67 of the stop 65. However, in such cases the stop 65 cannot be used with such facility in the way above explained to promote ready operation of the gauge, and if the gauge lines are not at right angles to each other the two sets of graduations cannot have a common zero mark.

The modified gauge shown by Figs. 9 and 10 is identical with that shown by Figs. 1 to 4 except that the stop 65, instead of being carried by and rotating with the disk 49, is stationary relative to the disk. In this modification one of the side portions 29 of the U-shaped member embracing the portion 15 of the gauge arm is provided with an integral extension 75 which integrally carries the stop 65. As shown (Fig. 10), the body of the extension is slightly spaced from the adjacent surface of the disk to permit the latter to rotate without interference, the surface of the stop adjacent the disk however substantially contacting with it to insure that the point of the saw tooth throughout the thickness of the saw will properly contact with the surface 67 of the stop, which surface, as heretofore explained, includes the axial line of the disk and the line of intersection of the gauge lines 61 and 63. The gauge according to Figs. 9 and 10 may be operated in exactly the same way as the gauge according to Figs. 1 to 5 except that the stop 65 not being mounted on the rotatable disk 49 cannot act to prevent rotation of the gauge relative to the saw in the way explained in connection with the gauge according to Figs. 1 to 5, and consequently the gauge requires more expertness on the part of the operator when using it.

It will be understood, that within the scope of the appended claims, wide deviations may be made from the forms of the invention described without departing from the spirit of the invention.

I claim:

1. A gauge for measuring the angle of clearance or rake of the tooth of a saw having, in combination, means providing a head having a relatively rotatable disk-like part adapted to be positioned parallel to the plane of the saw at one side thereof, a stop carried by said head presenting a surface adapted to contact the point of a saw tooth when said disk-like part is so positioned, which surface includes the line of the axis of rotation of said disk-like part, said disk-like part having an opening presenting an edge positioned radially of said part constituting a gauge line adapted to be moved into registry with an edge of a saw tooth by rotation of said part, which opening also presents a second edge at right angles to the first mentioned edge intersecting the latter at the line of the axis of rotation of said part, said second edge constituting a second gauge line also adapted to be moved into registry with an edge of a saw tooth by rotation of said part, and means for indicating the angular position of said rotatable disk-like part relative to the body of said head.

2. A gauge according to claim 1 in which the stop is carried by the rotatable part.

3. A gauge according to claim 1 in which the stop is carried by the body of the head independently of the rotatable part.

4. A gauge according to claim 1 having adjustable means for fitting it to a saw for sliding of the surface of the stop along the line which includes the points of the saw teeth.

5. A gauge according to claim 1 having a support for the head adapted to be mounted on a circular saw for rotation about the axis of the latter, means being provided for adjustably positioning said head on said support for causing the surface of the stop to contact the points of the teeth of the saw.

6. A gauge for measuring the angles of clearance and rake of the teeth of a circular saw having, in combination, an arm carrying a projecting pin adapting the arm to be mounted on the saw for rotation about the axis of the latter; a member slidably carried by said arm for adjustment radially of the saw; a disk-like part rotatably carried by said member; a stop on said disk-like part having a flat surface which includes the axial line of said part, which surface is adapted to be brought into contact with the point of a saw tooth by so sliding said member on said arm; said disk-like part having an opening presenting two edges at right angles to each other intersecting each other at the axial line of said part, one of which edges is in the plane of said flat surface, whereby when said arm is so mounted on the saw and said surface of said stop contacts the point of a saw tooth at the axial line of said disk-like part one of said edges by rotation of said part may be brought into coincidence with the clearance line of the saw tooth and the other into coincidence with the rake line of such tooth; and means for indicating the angular position of said disk-like part relative to said member in each of opposite directions from a position which would correspond to zero angles of clearance and rake of a saw tooth.

ERNEST J. BARTELL.

REFERENCES CITED

The following references are of record in the file of this patent:

UNITED STATES PATENTS

| Number | Name | Date |
|---|---|---|
| 1,814,266 | Stauder | July 14, 1931 |